United States Patent Office 3,290,574
Patented Dec. 6, 1966

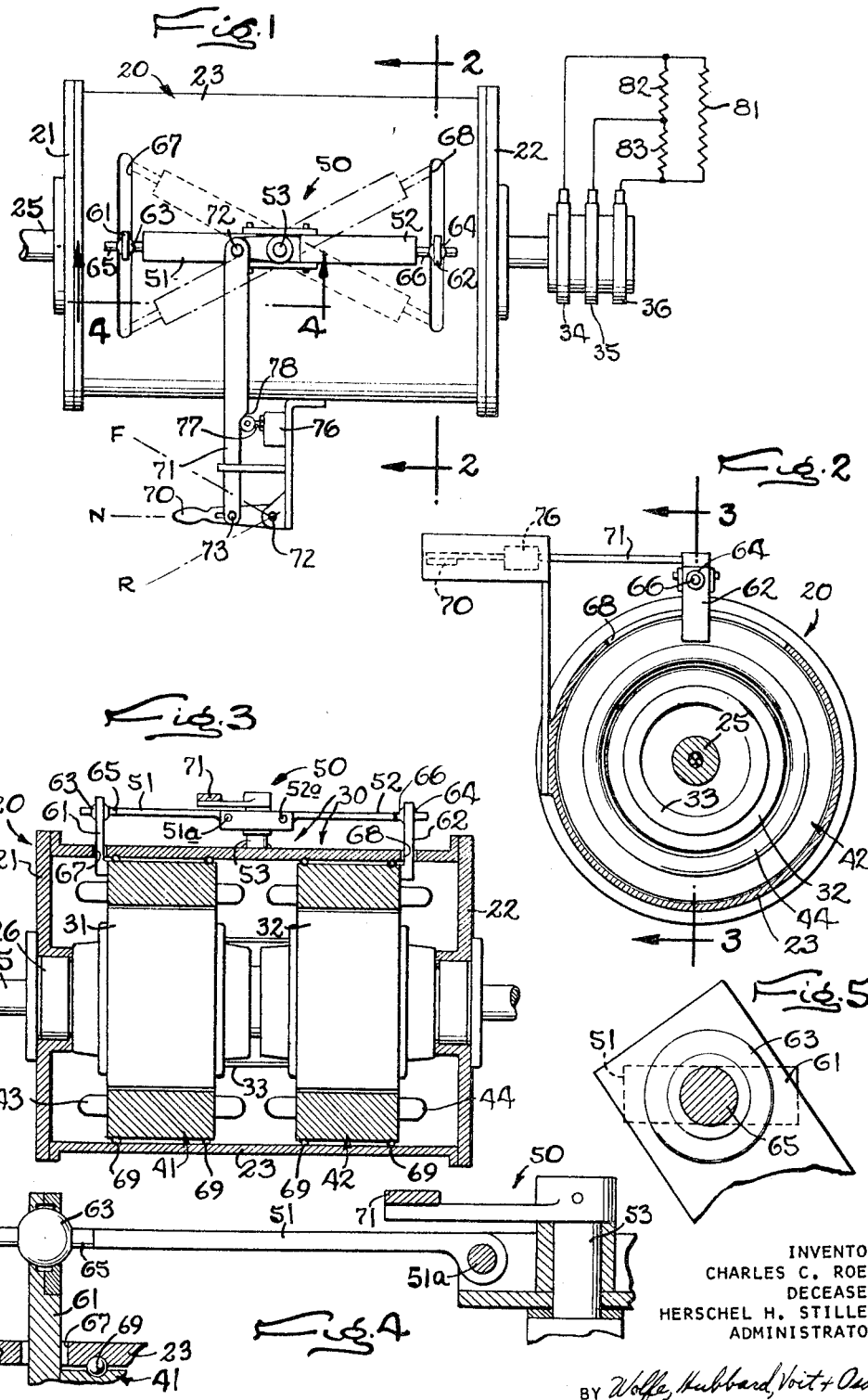

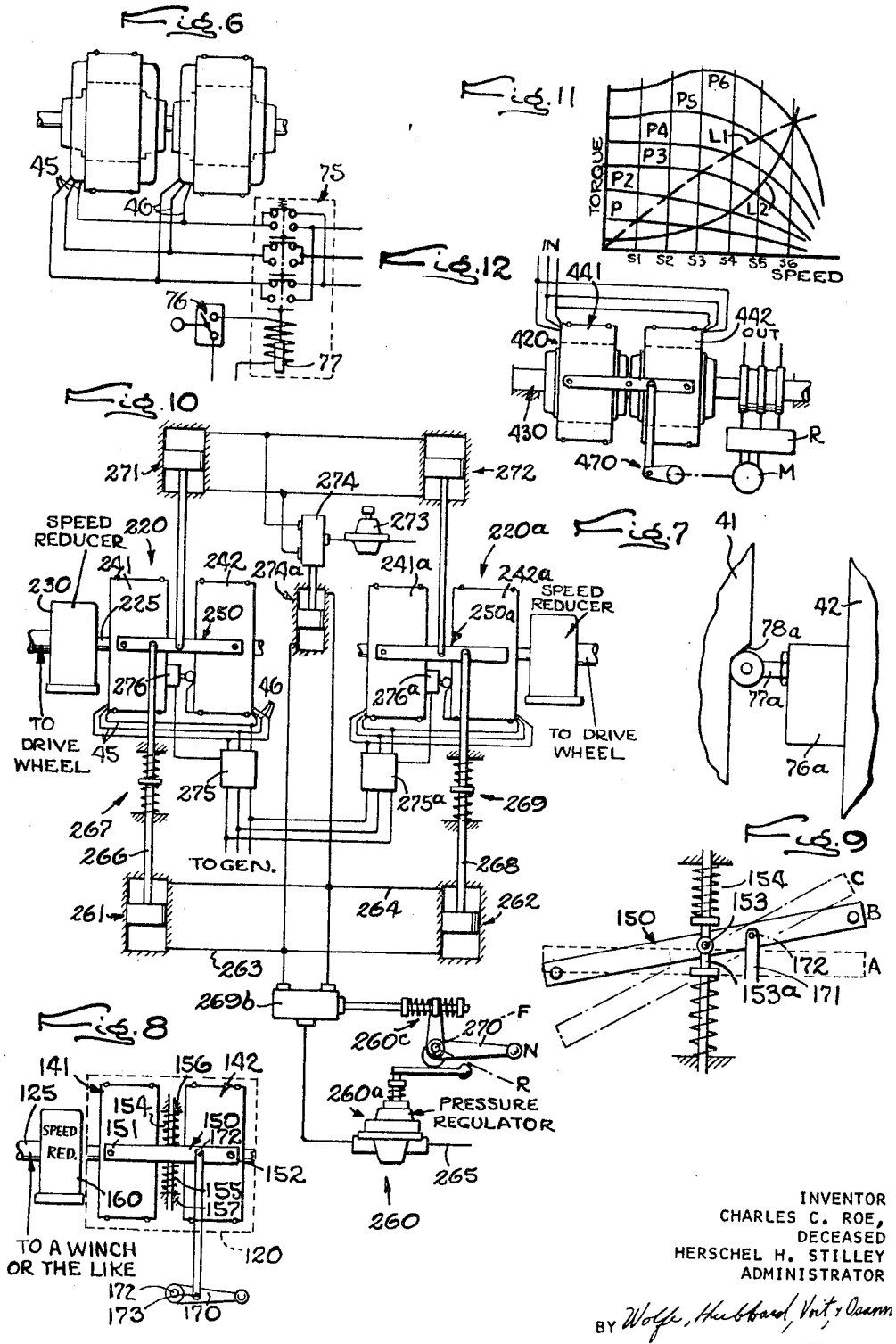

3,290,574
INDUCTION MOTOR CONTROL WITH PLURAL WOUND ROTORS WHICH ARE AXIALLY RELATIVELY MOVABLE FOR TORQUE CONTROL
Charles C. Roe, deceased, late of Rockford, Ill., by Herschel H. Stilley, administrator, Rockton, Ill., assignor to Warner Electric Brake & Clutch Company, South Beloit, Ill., a corporation of Delaware
Original application July 6, 1962, Ser. No. 207,886. Divided and this application Aug. 26, 1965, Ser. No. 482,948
4 Claims. (Cl. 318—214)

This is a division of copending application Serial No. 207,886, filed July 6, 1962, and assigned to the assignee of the present application.

The present invention relates to control of A.-C. motors and more particularly to means for controlling the speed and torque thereof and finding particular application in an earth moving vehicle but which is, nevertheless, useful wherever speed or torque variation under manual or automatic control is desired.

It is an object of the present invention to provide an A.-C. motor control system which avoids the expense and complexity usually associated with A.-C. control but which has control characteristics which are equal to and in many respects better than those of a highly developed D.-C. motor control system. More specifically, it is an object to provide an A.-C. motor control system which employs an A.-C. motor of the type having two relatively adjustable stators cooperating with a single rotor in which the motor characteristics are achieved by varying the physical phase position of the two stators relative to one another, but which incorporates a number of important improvements which overcome the disadvantages which have over the years been associated with this general type of motor.

It is another object of the present invention to provide an A.-C. motor control system for use with dual-stator motors which requires only small control forces to cover the complete range of speed and torque from zero to maximum and which permits such control to be achieved with small displacements, thereby permitting use of conventional small-stroke pneumatic and hydraulic as well as direct mechanical controls. More specifically, it is an object to provide an A.-C. motor and control arrangement in which control may be effected by simple positioning of a control element without necessity for overcoming any of the torque reaction of the motor and which, therefore, permits small components to be employed with motors having a wide range of size up to many hundreds of horsepower. It is also an object in this connection to provide an A.-C. motor control system which is ideally suited for remote control from a control station with simple control linkage sufficing between the control station and the motor in the form of mechanical, pneumatic or hydraulic connections.

In one of the aspects of the present invention it is an object to provide a motor control arrangement incorporating means for automatic reversal at the center of the control range so that a single controller suffices to cover the complete range of torque and speed available in both directions. In this connection, it is an object to provide an A.-C. motor control utilizing a single control element for forward and reverse operation and which may be moved from forward to reverse or vice versa to effect dynamic braking and which, therefore, avoids the necessity for conventional brakes to bring the load to a stop, or to effect reversal, in the shortest possible time.

While the invention is particularly well suited for use in an earth moving vehicle, its inherent advantages cause it to be similarly well suited for other uses employing either single drive motors or plural, cooperating drive motors wherever a fine degree of control is required as, for example, in the driving of machine tools, various processing equipment, conveyors, hoists, winches or wherever speed or torque must be varied. Or, if desired, motors and control systems of the present type may be used in applications where conventional induction motors normally suffice but where versatility of the driven machine is increased by the present control feature.

It is a related object to provide an A.-C. drive and control system which is well suited to applications formerly requiring elaborate arrangements to produce a desired output characteristic. For example, the present motor may be employed for a winch for handling refueling lines between ships or other applications where the motor must be capable of rotating in either one direction or the other for take up or pay out or remain stationary while maintaining the torque within a desired range.

It is a more specific object of the present invention to provide a control for an A.-C. motor in which the range of speed and torque is covered by the physical positioning of a control element and in which the electrical switching required for reversal is achieved without necessity for interrupting large amounts of current. On the contrary, the electrical switching in the present switching is caused to occur under conditions of zero voltage and zero current automatically and without care or attention on the part of the operator thereby enabling use of low power switches and contactors.

It is a general object to provide an A.-C. motor and control system in which the motor may be produced at a cost which does not appreciably exceed the cost of a conventional motor of the same maximum power rating and in which the auxiliary equipment required for use with the motor costs only a small fraction of that required in employing conventional motors in either an A.-C. or D.-C. system.

It is another general object to provide an A.-C. motor control system which has high efficiency and in which the load current under the various possible conditions of operation, including the stalled condition when the system is acting as a "torque motor," is minimized. It is an object of the invention in one of its aspects to provide an A.-C. motor control system employing a dual stator and wound rotor which insures even distribution of current flow in the rotor windings or bars and which therefore avoids the concentration of current which may exist in the rotor bars of conventional two-stator machines when the stators are offset from one another. In this connection it is an object to provide an A.-C. motor having a wound rotor but which may be employed, under blocked rotor conditions, as a variable transformer in which adjustment of voltage may be brought about using low power control elements. In the present construction, employing an equalizing linkage between the two stators, the control need not overcome the reaction force but need have power sufficient only to overcome the friction in moving the controlled stators between successive positions of adjustment.

Notwithstanding all of the above advantages, it is an object to provide an A.-C. motor control system which is simple and inexpensive, which is free of reliance upon electronic or other delicate control components, and which may be serviced or maintained in the field by one having only a rudimentary knowledge of A.-C. motor and control devices.

Other objects and advantages of the invention will become apparent upon reference to the detailed description and attached drawings in which:

FIGURE 1 is a side elevation of an A.-C. motor embodying a simplified form of the present invention.

FIG. 2 is a transverse section taken through the motor along line 2—2 in FIG. 1.

FIG. 3 is a longitudinal section taken along the line 3—3 in FIG. 2.

FIG. 4 is a fragmentary section taken along the line 4—4 in FIG. 1 showing the mounting of the differential linkage.

FIG. 5 is a fragment showing the nature of the connection between one end of the linkage and the associated stator.

FIG. 6 shows the supply wiring and reversing contactor for energizing the motor of FIG. 1.

FIG. 7 is a fragmentary somewhat diagramamtic view of an alternate mounting for the reversing switch between the adjacent stators.

FIG. 8 shows a system of the present type incorporating a yielding connection for automatic torque control.

FIG. 9 is a diagram showing the differential linkage of FIG. 8 in three positions in order to bring out the sequence of operation.

FIG. 10 shows motors of the above disclosed type employed as part of a novel driving and control system in a conventionally steerable vehicle.

FIG. 11 shows a family of speed torque curves obtainable at successive settings of the differential linkage together with representative load curves.

FIG. 12 is a diagram showing the inventive structure employed, with blocked rotor, as a voltage regulator.

While the invention has been described in connection with certain preferred embodiments, the invention is not limited thereto and it is intended to cover the various alternative and equivalent constructions included within the spirit and scope of the appended claims.

Turning now to FIGS. 1–5 of the drawings, there is disclosed a motor 20 having a frame which consists of end members 21, 22 and a cylindrical housing 23. Extending axially through the housing is a rotor shaft 25 mounted in suitable bearings 26. Secured to the shaft is a rotor assembly 30 which, in the present instance, consists of two portions 31, 32. Engaging both portions of the rotor is a winding 33 which is brought out to slip rings 34, 35, 36. Spaced side by side in the frame and alined with the portions 31, 32 of the rotor are stator assemblies 41, 42 having windings 43, 44, respectively. The windings 43, 44 are preferably three phase windings which may either be lap wound or wave wound having connections 45, 46, respectively, for connection to the regular three phase supply line. In accordance with well known A.-C. motor practice, the windings may be designed for four-pole operation to produce a nominal speed of 1750 r.p.m.

A.-C. motors are known in the art having separate stators arranged side by side and cooperating with a single rotor assembly and with one of the stators being angularly adjustable in order to adjust its physical phase positioning with respect to the other thereby to vary the motor output characteristics. Thus, in prior art devices one of the stators may be adjusted to a null position in which the voltage which it induces in the rotor winding is oppositely phased, and hence cancels, the voltage which is induced by the second stator so that the torque applied to the rotor is zero. Alternatively the movable stator may be adjusted to a position in which the induced voltages are additive for production of maximum torque.

In accordance with the present invention both of the stators 41, 42 are made rotatable with respect to the motor frame and are interconnected by a differential linkage having its ends connected to the stators and which has its neutral point anchored with respect to the motor frame so that the two stators are constrained to move equally and in opposite directions from the null position upon positioning by a control member. In the embodiment of the invention illustrated in FIGS. 1–5, the differential linkage, indicated generally at 50, is in the form of a centrally pivoted lever having a first end 51 which is connected to the stator 41 and a second end 52 which is connected to the stator 42. The linkage is centrally pivoted on the motor frame by a bolt or the like 53. For the purpose of coupling the stators to the ends of the differential linkage and to accommodate the relative endwise movement which occurs when the lever is rocked from the neutral position, telescoping ball-and-socket connections are provided. Thus, arms 61, 62 extend radially outward from the stators 41, 42 carrying balls 63, 64, respectively, (FIG. 4) each having a central bore. The ends of the lever carry cylindrical pins 65, 66 which are telescoped into the balls. Slots 67, 68 are formed in the motor housing to provide clearance for the arms 61, 62.

For the purpose of minimizing friction between the stators, 41, 42 and the motor frame, bearings are interposed which, in the present instance, consist of double rows of ball bearings 69 occupying suitable complementary grooves formed on the outside of the stator assemblies and the inside wall of the housing 23. It will be apparent, however, that other anti-friction bearing arrangements may be employed between the stators and the frame without departing from the invention.

In order to permit the ends of the lever to follow the curvature of the motor frame, the lever is provided with transverse hinge connections 51a, 52a.

In carrying out the present invention, the stators 41, 42 are so phased with respect to one another that when the arms 61, 62 are in alinement, with the differential lever 50 horizontal, the stators define a "null" condition in which the induced voltages are opposite in phase and cancel one another. Manually controlled means are provided for tilting the lever 50 so that the stators are adjustably offset with respect to one another thereby to produce a net induced voltage in the rotor winding. In the simplest form of the invention such position means includes a quadrant lever 70 which is connected to the lever 50 by means of a link 71 having pivot connections 72, 73 at its ends.

In accordance with one of the aspects of the invention, means are provided for reversing the connection to the stator windings as the quadrant lever 70 transverses the null position so that "forward" rotation of the motor is obtained when the quadrant lever is moved in one direction from neutral and "reverse" operation is obtained when the quadrant lever is moved in the opposite direction. In order to understand the means employed for bringing about the reversal, specific reference is made to FIGS. 1 and 6. Thus, interposed between the three phase supply line and the leads 45, 46 which are connected to the stators, is a reversing contactor 75 which is under the control of a switch 76 having a plunger 77. Means are provided for causing operation of the switch 76, and hence of the reversing contactor 75, at the "null" whenever the quadrant lever 70 is rocked in the "reverse" direction. In the present instance this may be simply accomplished by forming a cam rise 78 on the link 71 which is coupled to the quadrant lever. Or, if desired, the same effect may be achieved by employing a reversing switch which is directly coupled to the two stators and which is operated when the stators are moved relative to one another in one of the two possible directions from the "null," namely, the direction which corresponds to the "reverse" setting of the quadrant lever. Thus, as shown in FIG. 7, a reversing switch 76a is provided having a plunger 77a, the body of the switch being mounted upon the stator 42 and the plunger 77a cooperating with a cam rise 78a on the stator 41.

In operation and with the quadrant lever set in neutral position, the stators 41, 42 are in their "null" position so that the motor does not rotate even though the motor leads 45, 46 are energized. When rotation of the motor is desired in the forward direction, the quadrant lever is moved "forward," progressively tilting the differential lever 50 so that the stator 41 is rotated clockwise and the stator 42 counterclockwise as viewed from the right hand end of the machine. As the two stators are thus moved into phase alinement, the voltages which they induce in the rotor are progressively in phase producing progressively increased torque. In the case of a four pole motor, full torque is produced when the two stators are offset with respect to one another by ninety degrees as shown by the dotted outline in FIG. 1.

In order to brake the motor to a stop and produce rotation of the shaft in the opposite direction, the quadrant lever is pulled back to its neutral position. If the lever is pulled back rapidly, any tendency for the rotor to "overrun" results in generator action. When the quadrant lever traverses the neutral position, the cam rise 78 engages the plunger 77 of the reversing switch thereby causing the contactor 75 to reverse the connections to the motor leads. Specifically, two of the three leads are switched with respect to the two supply lines which they engage. The result is to produce a field which rotates in the opposite direction. Thus, torque is applied to the rotor in the opposite direction which brakes the load to a stop and then causes the load to rotate in the opposite direction. When the end point of the stroke is reached, indicated by the dot-dash outline in FIG. 1 the reverse torque is maximum. The quadrant lever may then be restored to its neutral position and may be momentarily moved beyond neutral into the "forward" range to effect dynamic braking.

While mention has been made in the above description of "increasing" and "decreasing" the motor torque, it will be understood that this refers to torque capability with the motor connected to a load. Also it should be kept in mind that while the above description has mentioned variation in torque from zero to maximum in each direction, the control, in a practical case, permits the speed to be varied over a wide range depending upon the speed-torque characteristic of the load and the speed-torque characteristic which is applicable to the motor for any given setting of the control member. Briefly stated, the speed at any setting of the control member is that which will cause the torque exerted by the motor to equal the torque reaction exerted by the load so that a condition of equilibrium is established at which the motor speed tends to remain constant.

With the operation of the motor in mind, more specific reference may be made to the nature of the rotor winding 33. Preferably the winding 33 is of the "wound" type rather than the "squirrel cage" type. A "wound" winding has a number of advantages in the present combination. In the first place the heating effect of the rotor current is more evenly distributed throughout the rotor. Next it permits the ends of the windings to be conveniently brought out for the connection of auxiliary or series resistors, shown at 81, 82, 83, (FIG. 1) for adjustment of the speed torque characteristics and, more particularly, for enabling any desired torque to be achieved under starting conditions. That is to say, under starting conditions, and when the rotor is turning at substantially less than synchronous speed, the auxiliary resistors 81, 82, 83, which are externally mounted, enable high torque and serve to dissipate the energy of slip in the form of heat safely outside of the machine. Preferably the resistance is just high enough to produce adequate starting torque for the intended usage. It is found that the inclusion of even a small amount of resistance in a practical case on the order of a tenth of an ohm or less, causes the reactive flux, due to the current flowing through the rotor winding, to be offset sufficiently with respect to the flux of the rotating field so that the field flux is enabled to "penetrate" the rotor. Where the invention is employed with the rotor of the squirrel cage type, resistance can be incorporated, but varying its value is less convenient. In any event, it will be found desirable to insulate the rotor bars in order to prevent the setting up of circulating currents in the two portions of the rotor, particularly under null conditions.

It is one of the primary advantages of the above described motor and control system that speed and torque variations may be achieved with only a light control linkage and using small forces exerted over small distances. This is true even through the motor may have a capability of many horsepower. The reason for this is that the control member is not required to overcome any of the reaction torque of the two stators. Instead, because of the differential nature of the linkage, the reaction torques of the two stators produce torques on the differential lever 50 which are in opposite directions and which, using identical stators, precisely cancel one another, while the total reaction torque is applied to the motor frame at the central point of pivoting 53. The practical result of this is that the differential lever may be adjusted to a given angled position by only light fingertip pressure, the amount of pressure being independent of the torque being exerted by the motor. Normal friction is sufficient to maintain the control member in a set position, although, if desired, additional friction may be incorporated as, for example, by tightening the point of pivoting of the quadrant lever 70.

While the invention has been described in connection with a particular form of differential linkage, namely, a centrally pivoted lever for the sake of simplicity, it will be understood by one skilled in the art that the invention is not limited to use of a differential lever but contemplates the use of any differential connection, the result of which is to produce equal and opposite movement of the two stators relative to the frame in which they are mounted. Thus, if desired, other specific lever arrangements may be employed or the two rotors may be coupled together by differential gearing or by a differential cable arrangement, or the like without departing from the invention, the neutral point of the linkage being coupled to the motor frame or to the structure to which the motor frame is secured.

In accordance with one of the aspects of the present invention, it is proposed that yielding means such as a spring or preloaded actuator be interposed between the neutral point of the linkage and the frame of the machine in place of the rigid connection 53 described above, thereby to limit the torque which may be exerted by the motor for any position of adjustment of the control member. More specifically, in accordance with the present invention, the reaction torque which is exerted by the stators is caused to bring about a corrective and automatic variation in torque to reduce the torque to predetermined level. Such a "torque limiting" characteristic is desirable for a number of applications, for example, in the operation of a winch to pay in or pay out cable between ships traveling side by side in a refueling operation, reference being made to FIG. 8. While this figure is diagrammatic, it will be understood that the motor shown therein corresponds to that previously described except for the mounting of the neutral point of the differential linkage. Thus, a motor 120 is provided having a shaft 125 carrying a suitable rotor assembly cooperating with stators 141, 142, respectively. Interconnecting the stators is a differential linkage or lever 150 having ends 151, 152. In place of the non-yielding pivot connection 53 at the center of the lever, the pivot connection is provided with springs 154, 155 which are seated with respect to the motor frame at 156, 157.

For the purpose of adjusting the nominal position of the differential lever, a quadrant lever 170 is provided which is coupled to the lever 150 by a link 171 having pivots 172, 173 at its ends. In order to maintain the set position of the quadrant lever 170, means (not shown) are preferably provided for inducing a certain amount of friction, for example at the quadrant lever pivot. Connected to the shaft 125 of the motor is a stepdown drive connection 160 which should preferably be of the reversible type where use is to be made of the motor's constant torque characteristics. By the term "reversible" is meant that the drive connection is capable of power flow in either direction which is to be distinguished from the usual worm gearing in which power can be transmitted only in one direction.

The operation of the device to produce torque limitation at the connected winch will be apparent upon reference to FIG. 9. The differential lever 150 normally, under the "off" condition, occupies the horizontal position indicated at A. When the quadrant lever 170 is moved from neutral, the differential lever 150 tends to move to a nominal angled position as indicated at B which corresponds to a certain output capability. However, when torque is exerted against the load, the total stator reaction torque is applied to the springs so that spring 154 tends to be compressed, as shown, and the spring 155 tends to be elongated. This causes the center of the lever 150 to move from the point 153 to the point indicated at 153a. Assuming that the quadrant lever has sufficient friction to hold it and its link 171 in the set position, the pivot 172 at the "inner" end of the link 170 will tend to remain stationary so as to become the fulcrum for any further lever movement. As a result, shifting of the center from the point 153 to the point 153a is accompanied by a change in the angle of the differential lever. Thus, the differential lever tends to occupy the final position C at a relatively shallow angle, thereby limiting the torque and tailoring it to the function to be performed.

The automatic self-corrective action of the above driving arrangement will be apparent by considering the effect of an increase or decrease in the torque exerted by the load. Assuming that the load is in the form of a cable interconnecting two ships in the event the ships move closer together, the reduction in the force exerted by the cable produces a reduction in load torque and hence a reduction in the reactive force exerted against the spring 154. The change in spring dimension (elongation) causes a shift of the fulcrum point, downwardly in FIG. 9, increasing the angling of the differential lever thereby shifting the operating point on the speed-torque characteristic of the motor, causing the motor torque to overcome the reaction torque of the load to wind in the slack cable. When the end of the slack is reached, the reaction torque of the load increases thereby compressing (shortening) the spring 154 so that the center of the differential lever again tends to move toward pivot position 153a, causing the differential lever to occupy a shallower angle and reducing the motor torque so that no further cable is wound in. In the event that the ships tend to separate, causing increased tension on the cable, further compression of the spring 154 occurs, causing the differential lever to occupy a still shallower position and momentarily reducing the torque so that cable may be played out from the winch. The net result is to provide an automatic winch control which tends to maintain a predetermined tension in the cable independently of whether cable is wound in or played out and with the amount of tension being adjustable simply by setting the quadrant lever 170.

In place of the springs 154, 155, a fluid actuator may be used supplied with fluid at a regulated pressure for yielding when a predetermined torque is exceeded.

It will be apparent to one skilled in the art that the present motor control system is ideally suited to perform the function of a "torque motor" with the rotor operating under stalled conditions and with rotation in one direction or the other only to the extent necessary to maintain torque equilibrium. It is found that the present motor is ideally suited to such operation since the net voltage which is induced in the rotor winding and which sets up circulating current therein is only that which is required to exert the desired torque and below the level which would cause overheating. It will also be apparent that the arrangement disclosed in FIG. 8 is not limited to operation in the vicinity of a stall but permits operation over a wide range of speed and torque where coupled to other types of loads. Where desired to operate the motor of FIG. 8 for driving in both directions, the reversing switch and circuitry of FIGS. 6 and 7 may be readily incorporated.

If desired, the springs 154, 155 may be utilized simply for protective purposes, by proper choice of pre-stress and spring rate so that yielding occurs only when the torque loading exceeds safe limits. Thus, the present type of drive may be placed in the hands of a relatively unskilled operator with assurance that the motor will not be burned out or overloaded by mishandling of the controls.

The present invention is also uniquely applicable to the driving of vehicles of both the conventionally steered and the skid-steered type. Application of the invention to a conventionally steered vehicle is shown more or less diagrammatically in FIG. 10.

Turning to FIG. 10, the drive motor 220, by way of example, has stators 241, 242 cooperating with a rotor (not shown) having a shaft 225. The shaft is connected to the driving wheel 201 via a suitable stepdown connection 230 which may, for example, be a set of planetary gearing. Similarly, the right hand drive wheel 202 is driven by the motor 220a having stators 241a, 242a.

In carrying out the present invention, means are provided for manually and simultaneously setting the differential linkages 250, 250a of both of the motors. This is accomplished in the present instance by a control 260 controlling positioning servos 261, 262, respectively, via air or hydraulic lines 263, 264. Air or hydraulic fluid is supplied to the control 260 via a supply line 265 which is connected to a suitable pressure source. The positioning servo 261 is shown in simplified form consisting of a conventional double ended actuator having a plunger 266 and a centering spring 267. The companion servo has a plunger 268 and centering spring 269.

The operation of the control 260 is such that when the quadrant lever, indicated at 270, occupies its central or neutral position, the pressure in the output lines 263, 264 is zero so that the plungers 266, 268 cause the differential levers 250, 250a to occupy the horizontal position as shown. In lieu of a double acting pressure regulator, a conventional single acting regulator 260a may be adapted to the present use, the output feeding a selector valve 269b which is thrown to either a first position to apply the output pressure to line 263 or a second position to apply the output pressure to line 264. Throw-over of the valve takes place during the initial movement of the quadrant lever in either direction. The further movement of the quadrant lever is accommodated by the take-up springs 260c.

For the purpose of opposing the reaction torque of the stators of each of the motors, the neutral points of the differential levers are connected to individual actuators capable of yielding when a predetermined torque is exceeded. These actuators, indicated at 271, 272 are connected to the air supply by means of an adjustable regulator 273 which determines the yield point. For the purpose of permitting the actuators 271, 272 to operate in either direction, a selector valve 274 is provided which is under the control of the pilot actuator 274a connected to the pressure lines 263, 264. It will suffice to say that when line 263 is active pressure is applied to one side of the actuators 271, 272, whereas, under the opposite condition, when line 264 is active, pressure is applied to the opposite side of the actuators 271, 272.

Prior to describing the operation of the system, mention may be made of the means for reversing the phase of the current supplied to the two driving motors. This is accomplished by providing a reversing contactor 275 which is under the control of a reversing switch 276. A corresponding contactor 275a and switch 276a are used with the opposite driving motor.

In order to understand the features and advantages of the driving arrangement of FIG. 10, it will be assumed that the vehicle is at rest, that the quadrant lever 270 is in a neutral position and that the motors are energized with the rotors stationary. It will further be assumed that the regulating valve 273 associated with the torque reaction actuators 271, 272 is adjusted to a point which will limit the torque exerted by the two motors to a safe value. To cause the vehicle to go forward, the operator moves the quadrant lever 270 in the forward direction. This pressurizes the line 263 which causes the servos 261, 262 to move the differential levers 250, 250a to an angled position, similar to the manner which has been described in connection with FIG. 9. Thus, both driving motors produce torque and the vehicle proceeds to move forwardly at a speed which is dependent upon the setting of the quadrant lever.

In the event of a turn, for example, a turn to the left, the left hand driving wheel is required to slow down and, in the case of an extremely sharp turn, the drive wheel and associated motor 220 may have to slow nearly to a stalled condition. The resulting increase in torque may exceed the "safe" value; if so, the pressure in the actuator 271 is overcome so that yielding movement of the plunger therein occurs to reduce the degree of angling of the differential lever as described in FIG. 9. This reduces the torque to a safe level until the turn has been completed.

It is one of the features of the present driving arrangement that the vehicle can be brought to a stop quickly by means of dynamic braking. Thus, to stop, all that the operator has to do is to move the quadrant lever 270 back to neutral and thence in the "reverse" direction. Movement through neutral effects reversal of the reversing switches 276, 276a so that torque is subsequently applied to the rotor in the opposite direction. Movement through neutral also reverses the direction of applied pressure in the servos 261, 262 and in the torque reaction actuators 271, 272. Consequently, with continued movement of the quadrant lever in the "reverse" direction, torque is applied to the driving wheels in a direction to arrest forward movement and, as the vehicle comes to a stop, the quadrant lever is restored to its neutral position. In the event that the quadrant lever is thrown so violently in the reverse condition as to run the risk of overloading the motors or generator, yielding takes place at the actuators 271, 272 causing a shift of fulcrum of the differential levers 250, 250a so that the levers assume a shallower position, with reduced applied torque. This is notwithstanding the fact that the quadrant lever 270 may be in its "full reverse" position.

It is apparent then that a drive system has been produced for a steerable vehicle which permits control by a single quadrant lever in either the forward or reverse directions and which, upon throwing the quadrant lever to its opposite position, results in immediate dynamic braking, with the motors and generators being protected in both the driving and braking conditions against flow of excess current. Consequently, a vehicle having the present control system may be operated by a relatively inexperienced operator with instinctive control and without hazard to the equipment.

It will be appreciated that heavy vehicles, particularly vehicles employed for earth moving purposes and of the conventional steered or skid-steered type must operate on construction jobs which are often quite remote from service facilities. Consequently, it is noteworthy that the extreme flexibility provided by the present control and the inherent protective features have been achieved without recourse to complicated circuitry or fragile electronic components. On the contrary, the entire arrangement is so simple and straightforward that service can be taken care of right in the field by personnel having no more than a rudimentary knowledge of electricity and mechanics. Thus, there is no necessity, in the event of breakdown, for waiting until an electronics technician or engineer can make the necessary correction. Nor are there any adjustments to be made by the machine operator, and which may be thrown out of kilter by one who is careless or lacks understanding. Expensive "down" time is minimized and machines employing the presently disclosed drive systems may be sent to remote locations without fear of service problems. Nor, at the other extreme, are brute force control components required. All of the control components may be relatively small and inexpensive because of the light, short strokes which suffice to cover the control range. Relatively light reversing contactors may be used since switching only takes place when the stators are alined in the "null" condition when the current is, therefore, zero. And, as previously stated, dynamic braking suffices to perform all the necessary braking and steering functions so that the high initial expense and high maintenance cost of brakes are eliminated.

The A.-C. motors may be constructed using conventional motor manufacturing techniques and the cost, per horsepower, is not substantially greater than that of comparable motors not having the present control features.

Nor is the present control system limited to special or difficult motor control applications. On the contrary, it may be employed wherever variable speed or torque are required, even for those applications where conventional, constant speed induction motors have sufficed as, for example, in the driving of fans or blowers.

The versatility of the present motor control system in accommodating different types of loads is brought out by the speed torque diagram shown in FIG. 11. This figure shows a family of speed torque curves P1–P6 corresponding to successive positions of the control member, i.e., successive amounts of offset of the stators from the "null" position and with assumed resistance in the motor circuit to provide good starting torque. In the case of a load having a downwardly concave torque characteristic as shown by the load curve L1, it will be understood in the art that operation will take place at the conditions of equilibrium defined by the successive intersections between the load curve and the family of motor curves. Thus, a wide range of speed, here indicated by the values S1–S6 inclusive, is available. The present motor is not limited to any particular load characteristic, and it will be apparent that a load curve L2 which is concave upwardly (as in the case of a fan load) also makes a series of intersections with the curves in the motor family to define successive points of operating speed. Moreover, the motor may be readily adapted for accommodation to loads which are widely different from those shown at L1, L2 in FIG. 11. In fact, the present motor and control system may be adapted to any desired load simply by plotting the load curve and adjusting the motor parameters to produce a family of motor curves which intersect the load curve at successive points and at a substantial angle. One parameter which is readily changed is that of rotor resistance. Another is that of the depth of the rotor slots. It is possible to bring about a more radical change by employing motor windings which are switchable between two-pole and four-pole operation at the central part of the total speed range, a matter well within the skill of the art bearing in mind the above teachings.

In accordance with one of the aspects of the invention the rotor may be blocked and output voltage may be taken from the rotor slip rings, thereby employing the structure as a variable transformer, using the same control system as that disclosed, for example, in FIGS. 1–5. Such an arrangement is disclosed in FIG. 12, which shows a machine 420 having a blocked rotor assembly 430 and stators 441, 442 mounted for rotational adjustment, just as above, under the control of a quadrant lever or suitable adjusting member 470. One advantage of the arrangement is that, since the reaction torque of the two stators is self-canceling, the full range of voltage from zero to maximum may be achieved employing light control forces. Because of the light control forces the device is well suited for automatic control of voltage using light and inexpensive control elements, for example, a relay R which makes one contact or another depending upon whether the voltage is below or above a desired value and a small reversible motor M which is coupled to the control member 470 for correctively adjusting it so that the output voltage will be automatically maintained at a desired value regardless of the amount of load.

It will be understood that while the construction and control system is primarily intended for use as an induction motor it may also be employed as an induction generator upon providing means for driving the shaft and with the control member being settable to determine the amount of energy which is pumped into the line.

What is claimed is:

1. In an A.C. motor the combination comprising a source of A.C. current, a frame, first and second stators arranged side by side in said frame and having substantially identical windings thereon for setting up separate rotating fields, a rotor rotatably mounted in said frame for cooperation with the stators and having a single set of windings thereon with voltages being induced in separate portions thereof by the stator fields, said stators both being relatively movable in said frame between a null phase relation in which the induced voltages cancel for production of substantially zero torque and offset positions on each side of the null phase relation for production of progressively increased torque, a differential linkage for interconnecting the stators and the frame so that the stators are constrained to move equally in opposite directions from the null phase relation, a control member coupled to said linkage so that the output torque goes from maximum to zero and then again to maximum during continuous movement of the control member, and means for reversing the stator windings with respect to the current source automatically as the control member is moved through its zero torque position.

2. For use with a source of A.-C. supply current an A.-C. motor comprising in combination a frame, first and second stators arranged side by side in said frame and having substantially identical windings thereon connected to the supply for producing separate rotating fields, a rotor rotatably mounted in said frame for cooperating with both of said stators and having a single set of windings thereon with voltages being induced by the stator fields in separate portions of the windings, said stators both being relatively movable in said frame between a null phase relation in which the induced voltages cancel for production of zero torque and an alined phase relation in which the induced voltages are additive for production of maximum torque, a differential linkage for interconnecting the stators and the frame so that the stator reaction torque is absorbed by the frame and so that the stators are constrained to move in equal and opposite directions from the null condition for progressive increase in output torque, a control member coupled to the linkage for movement in opposite directions from a null position, and reversing switch means operated incident to the control members passing through its null position for reversing the connections between the stator windings and the supply so that the motor operates in opposite directions with progressively increased torque upon movement of the control member in opposite directions from the null position.

3. In an A.-C. motor the combination comprising for energization for A.-C. supply lines, a frame, first and second stators arranged side by side in said frame and having substantially identical windings thereon coupled to the supply lines for setting up separate rotating fields, a rotor rotatably mounted in said frame for cooperation with the stators and having a single set of windings thereon with voltages being induced in separate portions thereof by the stator fields, auxiliary resistors external to the rotor and connected in series with the rotor windings, said stators both being relatively movable in said frame between a null phase relation in which the induced voltages cancel for production of substantially zero torque and offset positions on each side of the null phase relation for production of progressively increased torque, a differential linkage for interconnecting the stators and the frame so that the stators are constrained to move equally in opposite directions from the null phase relation, a control member coupled to said linkage so that the output torque goes from maximum to zero during continuous movement of the control member, a reversing switch interposed between the supply lines and the stator windings for changing the direction of phase rotation in the latter, and means for operating the switch automatically as the control member is moved through its zero torque position.

4. In an A.-C. motor the combination comprising a source of A.-C. current, a frame, first and second stators arranged side by side in said frame and having substantially identical windings thereon for setting up separate rotating fields, a rotor rotatably mounted in said frame for cooperation with the stators and having a single set of windings thereon with voltages being induced in separate portions thereof by the stator fields, at least one of said stators being relatively movable in said frame between a null phase relation in which the induced voltages cancel for production of substantially zero torque and offset positions with respect to the null phase relation for production of progressively increased torque, linkage means for interconnecting said movable stator and the frame so that said movable stator is constrained to move towards and away from the null phase relation, a control member coupled to said linkage so that the output torque goes from maximum to zero and then again to maximum during continuous movement of the control member, and means for reversing the stator windings with respect to the current source automatically as the control member is moved through its zero torque control position.

References Cited by the Examiner

UNITED STATES PATENTS

| 727,662 | 5/1903 | Meuschel | 318—234 X |
|---|---|---|---|
| 1,144,012 | 6/1915 | Walton | 318—243 |
| 2,524,361 | 10/1950 | Sawyer et al. | 318—243 |
| 2,600,523 | 6/1952 | Ellis | 318—243 |
| 2,805,375 | 9/1957 | Morgan | 310—112 X |
| 3,017,528 | 1/1962 | Ellis | 318—243 X |

FOREIGN PATENTS 979,689   4/1951   France.

ORIS L. RADER, *Primary Examiner.*

T. LYNCH, *Assistant Examiner.*